United States Patent [19]
Ohya

[11] Patent Number: 4,785,367
[45] Date of Patent: Nov. 15, 1988

[54] TAPE GUIDE BLOCK
[75] Inventor: Kinichiro Ohya, Kanagawa, Japan
[73] Assignee: TDK Corporation, Tokyo, Japan
[21] Appl. No.: 903,766
[22] Filed: Sep. 5, 1986
[30] Foreign Application Priority Data
  Sep. 10, 1985 [JP] Japan .............................. 60-138622[U]
  Jul. 22, 1986 [JP] Japan .............................. 61-112367[U]
[51] Int. Cl.⁴ .............................................. G11B 15/60
[52] U.S. Cl. ................................................ 360/130.21
[58] Field of Search .................................. 360/130.21; 242/197-200

[56] References Cited
  U.S. PATENT DOCUMENTS
  4,689,702  8/1987  Oishi ................................ 360/130.21

FOREIGN PATENT DOCUMENTS
53-87630   7/1978  Japan .
53-95817   8/1978  Japan .
56-50354  11/1981  Japan .
60-15879   1/1985  Japan .
 1440367   6/1976  United Kingdom ........... 360/130.21

Primary Examiner—A. J. Heinz
Attorney, Agent, or Firm—Fleit, Jacobson, Cohn & Price

[57] ABSTRACT

A metal material is drawn to form tape guide block blanks. The blanks are cut in the direction perpendicular to the direction of the drawing so as to form upper and lower surfaces of the tape guide blocks. The tape guide blocks are preferably stacked one another for their cutting.

11 Claims, 3 Drawing Sheets

FIG. I
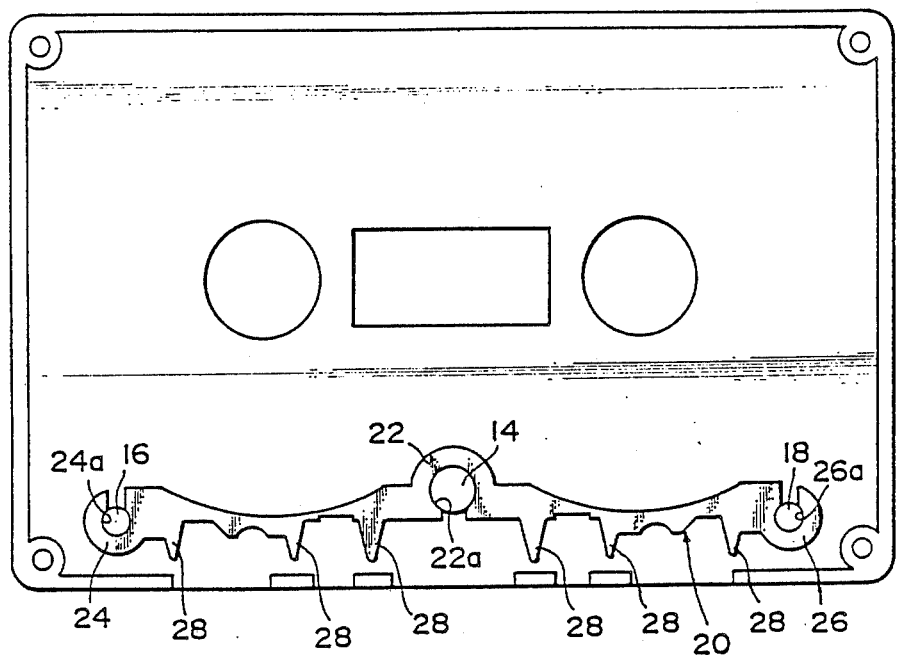
FIG. 2
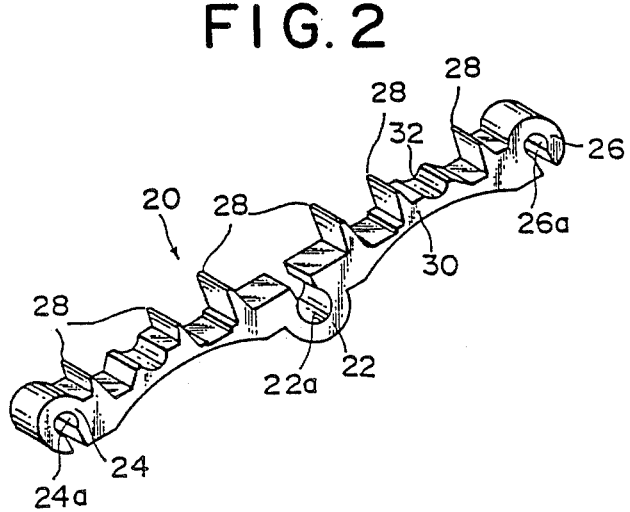

TAPE GUIDE BLOCK

BACKGROUND OF THE INVENTION

This invention relates to a tape guide block in a three piece type tape cassette which is composed of upper and lower cassette halves and the tape guide block, and a method of producing the same.

Three piece type tape cassettes in which a tape guide block is formed separately from upper and lower cassette halves have been proposed for the purpose of solving the problems experienced with two piece type cassettes in terms of accuracy and manufacture. Such problems still remain with three piece type cassettes, and propositions for further improvements have been made with respect to the structure of the tape guide block and the method of forming the same. However, propositions heretofore put forward have only succeeded in partially solving these problems.

For example, Japanese Patent Publication No. 50354/1981, Japanese Utility Model Laid-Open No. 87630/1978 and Japanese Utility Model Laid-Open No. 95817/1978 disclose arrangements in which mold drawing of injection molding is made in the direction of the reference level surface of a cassette half so as to set the tape guide surface of a tape guide block perpendicular to the reference level surface. Accordingly, it is necessary with such arrangements for a drawing inclination to be provided on each of the inner surfaces of upper and lower cassette halves. In Japanese Utility Model No. 95817/1978, a slanted surface is formed on a part of each of the upper and lower cassette halves on account of the need for such an inclination so that the tape guide surface is set accurately perpendicular to the reference level surface of the cassette halves. This arrangement necessitates a high degree of accuracy in manufacturing the cassette halves. On the other hand, the techniques disclosed in the other two publications do not take account of this need, and they therefore still involve the problem of difficulty in positioning the guide block accurately and stably in relation to the cassette halves.

All of the above-described techniques employ a recessed guide wall formed on the inner surface on each of upper and lower cassette halves as a basis for positioning and fixing the guide block to the cassette halves. Therefore, it is necessary for these techniques to accurately form the guide walls over a large area. The problem of the play which tends to occur between the parts also remains.

The above-mentioned Japanese Patent Publication No. 50354/1981 also discloses a measure for solving the problems of wear and heat generation caused by the friction between the guide surface and the tape. That is, guide rollers are integrally formed through the medium of tension arms constituted by thin webs so as to form a guide block on a tape guide mechanism component, and the guide rollers are resiliently shifted by virtue of the resiliency of the tension arm, thus reducing the friction and heat generation experienced. Since the integral formation of the tape guide mechanism component and the guide roller of this arrangement involves a tension arm to which a proper resiliency must be applied by the thin web, the construction of these integral parts are complicated, so that it is difficult to form these parts.

Another technique which provides a measure for solving the above-described problem of friction from a different aspect is disclosed in Japanese Patent Laid-Open No. 15879/1985. According to this technique, a guide block is formed of a non-magnetic material by die casting so as to mechanically reduce wear and heat generation caused by friction. However, this technique requires the work of finishing the shape and dimension of the guide block using tools such as bites since the guide block is formed by die casting.

SUMMARY OF THE INVENTION

Therefore, it is an object of the present invention to provide a tape guide block which enables the upper and lower cassette halves to be readily manufactured by setting the tape guide surface perpendicular to the reference level surface and also by forming the upper and lower surfaces of a guide block so as to define parallel planes and which enables the reduction in the number of component parts by forming all tape guide portions in one united body.

It is another object of the present invention to provide a tape guide block which is provided in the above-described form and which can be accurately positioned by being secured to a cassette halves at its different portions including arched tape guide portions formed at its left and right ends.

It is a still another object of the present invention to provide a tape guide block having a configuration arranged such that the upper and lower surface of a guide block form flat and parallel planes and also such that the tape guide surface is set perpendicular to the reference level surface, thus facilitating the manufacture of the upper and lower cassette halves and enabling a plurality of guide blocks to be formed at the same time.

It is a still another object of the present invention to provide a method of producing a tape guide block having a configuration arranged such that the upper and lower surface of a guide block form flat and parallel planes and also such that the tape guide surface is set perpendicular to the reference level surface.

It is a still another object to provide a method of producing a plurality of tape guide blocks of the above-mentioned type at the same time.

According to the invention, in one aspect, there is provided a tape guide block employed with upper and lower cassette halves to form a tape cassette, the tape guide block being formed such that a metal material is worked by drawing and two or more blanks thereby obtained are laid one on the other and cut in the direction perpendicular to the direction of the drawing, thereby forming the upper and lower surfaces of said tape guide block which define parallel planes, a tape guide surface perpendicular to the upper and lower surfaces, and arched tape guide portions as left and right end guide portions on the tape running surface.

According to the invention, in another aspect, there is provided a tape guide block which is employed together with upper and lower cassette halves to form a tape cassette, the shape of the tape guide block being arranged such that, when metal blanks are worked by drawing and two or more blanks thereby worked are laid one on the other and cut in the direction perpendicular to the direction of the drawing so as to form more than two tape guide blokcs at a time, the lower one of the tape guide blocks supports the upper one at a multiplicity of points thereon.

According to the invention, in still another aspect, there is provided a method of producing a tape guide block which is employed together with upper and lower cassette halves to form a tape cassette, comprising the steps of, preparing metal blanks for a tape guide block by drawing, stacking metal blanks on one another so that the lower one of the tape guide blocks supports the upper one at a multiplicity of points thereon, and cutting the metal blanks in the direction perpendicular to the direction of the drawing so as to form more than two tape guide blocks at a time.

DESCRIPTION OF THE DRAWING

The present invention will now be described in detail with reference to the presently preferred embodiments illustrated in the accompanying drawings in which:

FIG. 1 is a plan view showing a lower cassette half of a tape cassette and a guide block according to one embodiment of the invention;

FIG. 2 is a perspective view of the guide block shown in FIG. 1;

DESCRIPTION OF THE PREFERRED EMBODIMENTS

Figure 3:
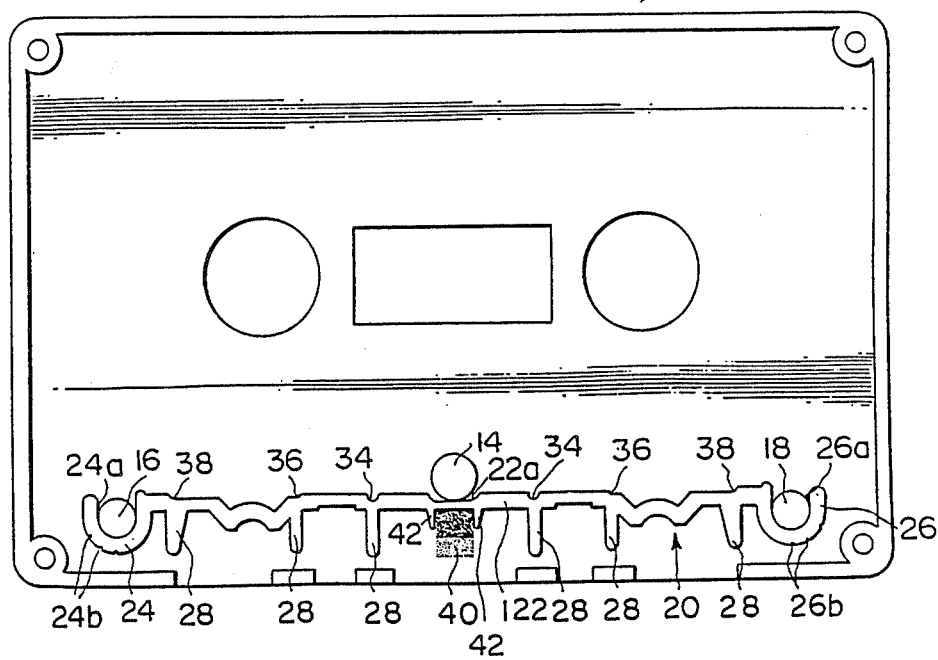
FIG. 3 is a plan view of a lower cassette half of a tape cassette and a guide block according to another embodiment of the invention.

The present invention will now be described in detail by referring to the embodiments shown in the accompanying drawings.

A first embodiment will be explained with reference to FIGS. 1 and 2.

A tape cassette is provided with an upper cassette half (not shown) and a lower cassette half 12 and a guide block 20 secured between the upper and lower cassette halves. A metal material is drawn and thereafter cut perpendicularly in relation to the direction of the drawing at intervals slightly larger than the tape width, thus forming the guide block 20 having the upper and lower surfaces 30 and 32 which are flat and parallel with each other. The metal material is preferably aluminium, and alumite finish is applied on the surface of the blank so as to form a hard coat (wear resistant coat) thereon.

The guide block 20 has a central projecting portion 22, arched tape guide portions 24 and 26 formed at its left and right ends, and a plurality of wedged guide portions 28 extending from the midsection portions. Channels 22a, 24a and 26a through which the tape guide block is positioned and secured by pins 14, 16 and 18 (shown in FIG. 1) of the upper and lower cassette halves 16 are formed at the central portion 22 and at the left and right arched tape guide portions 24 and 26. As is apparent from the drawing, the direction in which the channel formed at the central portion is opened is reverse to the direction in which the channels formed at the left and right arched tape guide portions are opened, so that the lateral movement of the guide block is thereby prevented and the guide block is accurately positioned. Each of the pins 14, 16 and 18 may be constituted by properly divided parts each formed on the upper and lower cassette halves or by a full-length part formed on one of the cassette halves.

Figure 4:
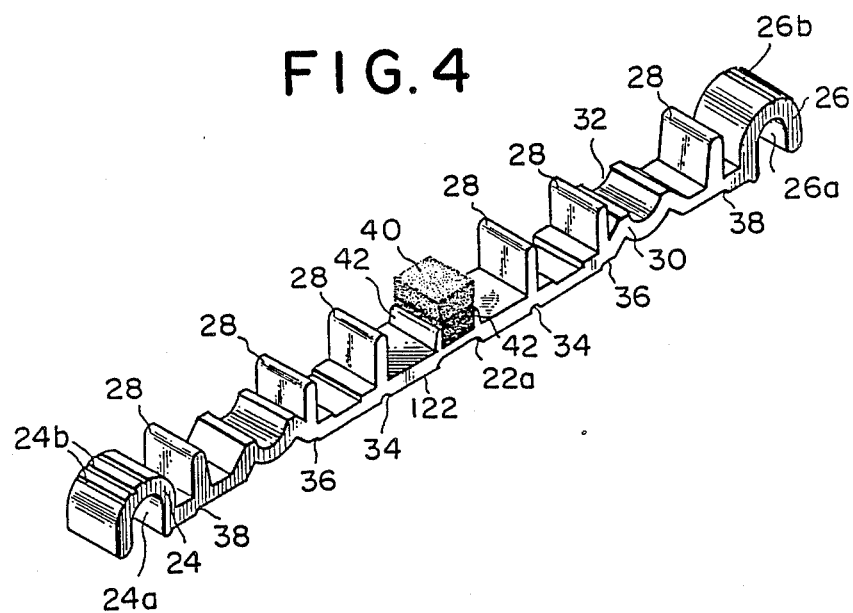
FIG. 4 is a perspective view of the guide block shown in FIG. 3.

Now, a second embodiment will be explained with reference to FIGS. 3 to 5.

The tape cassette is provided with an upper cassette half (not shown) and a lower cassette half 12 and a guide block 20 secured between the upper and lower cassette halves. A metal material is drawn and thereafter cut perpendicularly in relation to the direction of the drawing at intervals slightly larger than the tape width, thus forming the guide block 20 having the upper and lower surfaces 30 and 32 which are flat and parallel with each other. The metal material preferably aluminium, and alumite finish is applied on the surface of the blank so as to form a hard coat (wear resistant coat) thereon.

The guide block 20 has a central plate portions 122 which is substantially flat, arched tape guide portion 24 and 26 formed at its left and right ends, a plurality of guide portions 28 extending from the midsection portions, and a plurality of notches 34, 36 and 38 formed on a side opposite to the side on which the guide portions 28 are formed.

The plate portion 122 has a shallow channel 22a with a substantially flat bottom which provides the clearance for pins 14 of the upper and lower cassette halves. A pad 40 which resiliently presses against the tape is attached to the plate portion 122. Two ribs 42 for positioning the pad 40 when the pad is attached and for preventing the pad from being rolled are disposed on the plate portion 22.

The arched tape guide portions 24 and 26 have channels 24a and 26a for positioning the guide block in relation to pins 16 and 18 of the upper and lower cassette halves, and a plurality of narrow grooves 24b are formed on the outer periphery of each of the arched tape guide portions 24 and 26 for the purpose of reducing tape friction.

The top of each guide portion is rounded so as to be suitable for guiding the tape and, as described later, to adapt the lower blank of the guide blocks to support the upper blank when blanks of the guide blocks are cut.

Figure 5:
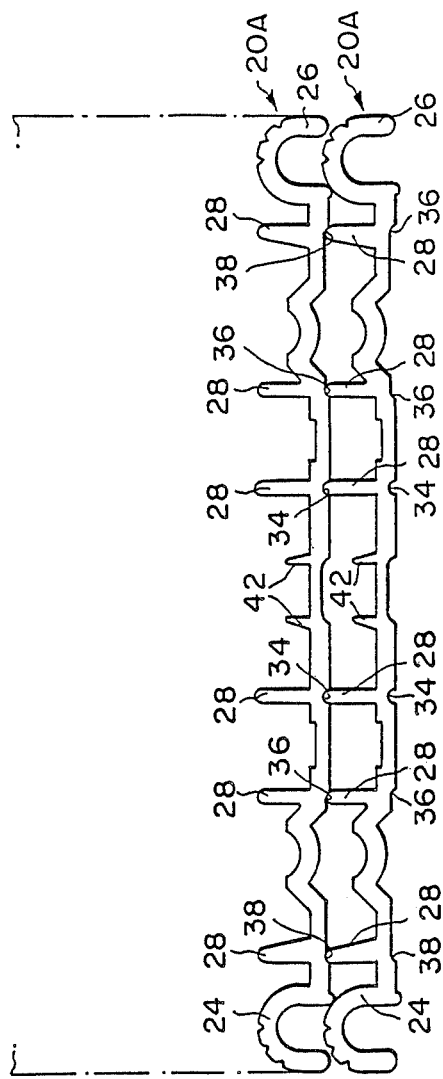
FIG. 5 is a side view showing stacked blanks of the guide blocks when the blanks formed by drawing are cut to form the guide blocks.

Referring to FIG. 5, the manner of forming the individual guide blocks from the blanks of the guide blocks is now described. FIG. 5 shows blanks 20A of the guide blocks which are formed by drawing and are stacked vertically. As is apparent from the drawing, the top of each guide portion 28 of the lower guide block blank 20A is fit into each of the notches 34, 36 and 38 of the upper guide block blank 20A so as to support the upper guide block blank. The guide block blanks are thus supported over the entire length thereof against the force applied by a cutter to the blanks.

Similarly, the arched tape guide portions 24 and 26 are formed such that the arched tape guide portions 24 and 26 of the lower guide block fittingly support those of the upper guide block blank.

According to the present invention, as described above, a metal material is drawn and blanks thereby formed are cut perpendicularly in relation to the direction of the drawing so as to form tape guide blocks. This method enables that the guide surface of the tape guide block is set perpendicular to the reference level surface; the form of the guide block having flat and parallel surfaces simplifies the construction of the cassette halves to which the guide block is adapted; the number of the component parts is reduced by intergrally forming the tape guide block together with the arched tape guide portions; and the guide block is accurately positioned by being secured at three points.

According to the present invention, as described above in detail, metal material is drawn and at least two blanks thereby formed are cut perpendicularly in relation to the direction of the drawing, thereby reading forming a plurality of guide blocks at the same time.

What we claim is:

1. An elongated tape guide block of cut drawn metal material and having a direction of drawing, which is to be employed with cassette halves to form a tape cassette, comprising cut opposite surfaces extending in a direction perpendicular to the direction of drawing of the tape guide block and which define parallel planes, a tape guide surface perpendicular to the opposite surfaces, and integrally formed left and right arched tape guide portions for changing the direction of tape running.

2. The tape guide block according to claim 1, further including a plurality of channels formed at least at said arched tape guide portions, said tape guide block being adapted to be secured by said channels to pins on at least one of the cassette halves.

3. The tape guide block according to claim 1, wherein the width of said tape guide surface is larger than that of a tape of the tape cassette.

4. The tape guide block according to claim 1, wherein said drawn metal material forming said tape guide block has a wear resistant coat.

5. The tape guide block according to claim 4, wherein said drawn metal material is aluminum, and said wear resistant coat is an alumite-finish coat.

6. An elongated tape guide block of cut drawn metal material and having a direction of drawing oriented normal to the length of said block, which is to be employed with cassette halves to form a tape cassette, comprising a plurality of notches on one side of the tape guide block and a plurality of projections on an opposite side of the tape guide block, the position of each notch corresponding to that of an extremity of each projection.

7. The tape guide block according to claim 6, further including arched tape guide portions which are integrally formed at left and right ends of said guide block so as to change the direction of tape running, each of said arched tape guide portions having a plurality of grooves over which a tape can run to provide the effect of reducing tape friction.

8. The tape guide block according to claim 7, further including a plurality of channels formed at least at said arched tape guide portions, said tape guide block being adapted to be secured by said channels to pins on at least one of the cassette halves.

9. A drawn metal blank for making elongated tape guide blocks which are to be employed with respective cassette halves to form tape cassettes, said drawn metal blank having a direction of drawing oriented normal to the length of said guide blocks and comprising a plurality of notches on one side of the metal blank and a plurality of projections on an opposite side of the metal blank, the position of each notch corresponding to that of an extremity of each projection, such that, when two or more of said blanks are laid adjacent one another for being cut in a direction perpendicular to the direction of drawing of the metal blanks, so as to form at least two tape guide blocks at a time, at least one of said metal blanks can support an adjacent metal blank with the extremities of said projections of the one metal blank received in the notches in the adjacent metal blank.

10. The drawn metal blank according to claim 9, further including arched tape guide portions which are integrally formed at left and right ends of said metal blank, for changing the direction of tape running in the tape guide blocks cut from the metal blank, each of said arched tape guide portions having a plurality of grooves over which a tape can run to provide the effect of reducing tape friction.

11. The drawn metal blank according to claim 10, further including a plurality of channels formed at least at said arched tape guide portions, to provide channels in the tape guide blocks cut from said metal blank, with each tape guide block being adapted to be secured by its respective channels to pins on at least one of its respective cassette halves.

* * * * *